(12) United States Patent
Zilliacus et al.

(10) Patent No.: US 8,010,621 B2
(45) Date of Patent: Aug. 30, 2011

(54) OFFLINE WEBPAGE ACTIVATED BY READING A TAG

(75) Inventors: Martin Zilliacus, Kauniainen (FI); Marco Sandrini, Helsinki (FI)

(73) Assignee: Nokia Corporation, Espoo (FI)

(*) Notice: Subject to any disclaimer, the term of this patent is extended or adjusted under 35 U.S.C. 154(b) by 1027 days.

(21) Appl. No.: 11/246,216

(22) Filed: Oct. 11, 2005

(65) Prior Publication Data

US 2007/0083535 A1 Apr. 12, 2007

(51) Int. Cl.
| | |
|---|---|
| G06F 15/16 | (2006.01) |
| G06F 17/00 | (2006.01) |
| G06K 5/04 | (2006.01) |
| G06K 7/10 | (2006.01) |
| G06K 9/32 | (2006.01) |
| G06K 9/18 | (2006.01) |
| G06K 15/00 | (2006.01) |
| G06K 9/80 | (2006.01) |
| G06K 9/36 | (2006.01) |

(52) U.S. Cl. ........ 709/217; 709/203; 709/218; 709/219; 235/375; 235/462.08; 235/462.09; 235/462.1; 235/462.13

(58) Field of Classification Search .................... 709/217
See application file for complete search history.

(56) References Cited

U.S. PATENT DOCUMENTS

| | | | |
|---|---|---|---|
| 5,490,217 A * | 2/1996 | Wang et al. | 235/462.09 |
| 5,850,187 A | 12/1998 | Carrender et al. | |
| 5,978,773 A | 11/1999 | Hudetz | |
| 6,078,251 A | 6/2000 | Landt et al. | |
| 6,199,048 B1 | 3/2001 | Hudetz et al. | |
| 6,286,043 B1 * | 9/2001 | Cuomo et al. | 709/217 |
| 6,311,214 B1 | 10/2001 | Rhoads | |
| 6,314,457 B1 | 11/2001 | Schena et al. | |
| 6,430,554 B1 | 8/2002 | Rothschild | |
| 6,448,979 B1 | 9/2002 | Schena et al. | |
| 6,542,927 B2 | 4/2003 | Rhoads | |
| 6,542,933 B1 | 4/2003 | Durst, Jr. et al. | |
| 6,616,047 B2 | 9/2003 | Catan | |

(Continued)

FOREIGN PATENT DOCUMENTS

WO WO 01/50224 7/2001

(Continued)

OTHER PUBLICATIONS

Davy Preuveneers and Yolande Berbers, Adaptive Context Management Using a component-Based Approach, Department of Computer Science, K.U. Leuven Celestijnenlaan 200A. B-3001 Leuven, Belgium, 2005, L. Kutvonen and N. Alnstioti (Eds.): DAIS 2005, LNCS 3543, ISSN 0302-9747, pp. 14-26, 2005.

(Continued)

Primary Examiner — Ian N Moore
Assistant Examiner — Jenee Alexander
(74) Attorney, Agent, or Firm — Locke Lord Bissell & Liddell

(57) ABSTRACT

A system for enabling a user to wirelessly download desired information in the form of a offline website without having to maintain a live Internet connection. Information is delivered from an active or passive source to a device via short-range wireless communication. This information is automatically interpreted by the device to form an offline version of a full-scale Internet website. The user may view the offline version of the website, and if additional information is desired, download or upload additional information at a time more convenient to maintain a live Internet connection.

28 Claims, 10 Drawing Sheets

U.S. PATENT DOCUMENTS

| | | | |
|---|---|---|---|
| 6,622,919 B1* | 9/2003 | Wilz et al. | 235/472.01 |
| 6,651,053 B1 | 11/2003 | Rothschild | |
| 6,669,087 B2 | 12/2003 | Wiklof et al. | |
| 6,766,947 B2 | 7/2004 | Wan et al. | |
| 6,853,294 B1 | 2/2005 | Ramamurthy et al. | |
| 6,907,568 B1 | 6/2005 | Meyers | |
| 7,072,672 B1 | 7/2006 | Vanska et al. | |
| 7,246,308 B1* | 7/2007 | Leblang et al. | 707/E17.111 |
| 2002/0116268 A1 | 8/2002 | Fukuda | |
| 2002/0130178 A1 | 9/2002 | Wan et al. | |
| 2003/0034399 A1* | 2/2003 | Wilz et al. | 235/462.45 |
| 2003/0088496 A1 | 5/2003 | Piotrowski | |
| 2003/0120745 A1 | 6/2003 | Katagishi et al. | |
| 2003/0227392 A1 | 12/2003 | Elbert et al. | |
| 2004/0087273 A1 | 5/2004 | Perttila et al. | |
| 2004/0203944 A1 | 10/2004 | Huomo et al. | |
| 2005/0003839 A1 | 1/2005 | Tripp | |
| 2005/0043995 A1 | 2/2005 | Nguyen | |
| 2005/0188051 A1* | 8/2005 | Sneh | 709/213 |
| 2005/0255839 A1 | 11/2005 | Perttila | |
| 2006/0010194 A1* | 1/2006 | Inage | 709/201 |
| 2006/0073788 A1* | 4/2006 | Halkka et al. | 455/41.2 |
| 2006/0095538 A1* | 5/2006 | Rehman et al. | 709/217 |
| 2007/0162350 A1* | 7/2007 | Friedman | 705/26 |

FOREIGN PATENT DOCUMENTS

| | | |
|---|---|---|
| WO | WO 01/73687 | 10/2001 |
| WO | WO 01/90935 | 11/2001 |
| WO | WO 01/90936 | 11/2001 |
| WO | WO 01/90937 | 11/2001 |
| WO | WO 2005/015486 | 2/2005 |
| WO | W02005022404 | 3/2005 |
| WO | WO 2006/111782 | 10/2006 |

OTHER PUBLICATIONS

Prof. Dr. Rolf Kraemer, Bluetooth Based Wireless Internet Applications for Indoor Hotspots: Experience of a Successful Experiment During CeBIT, IEEE, 2001, pp. 522-523.

Margaret Fleck, Marcos Frid, Tim Kindberg, Eamonn O'Brien-Strain, Rakhi Rajani, and Mirjana Spasojevic, From Informing to Remembering: Ubiquitous Systems in Interactive Museums, Hewlet-Packard Laboratories, IEEE, 2002.

PCT International Search Report, Feb. 7, 2007, 11 pages.

Office Action from the Patent Office of the People's Republic of China dated Mar. 13, 2009.

* cited by examiner

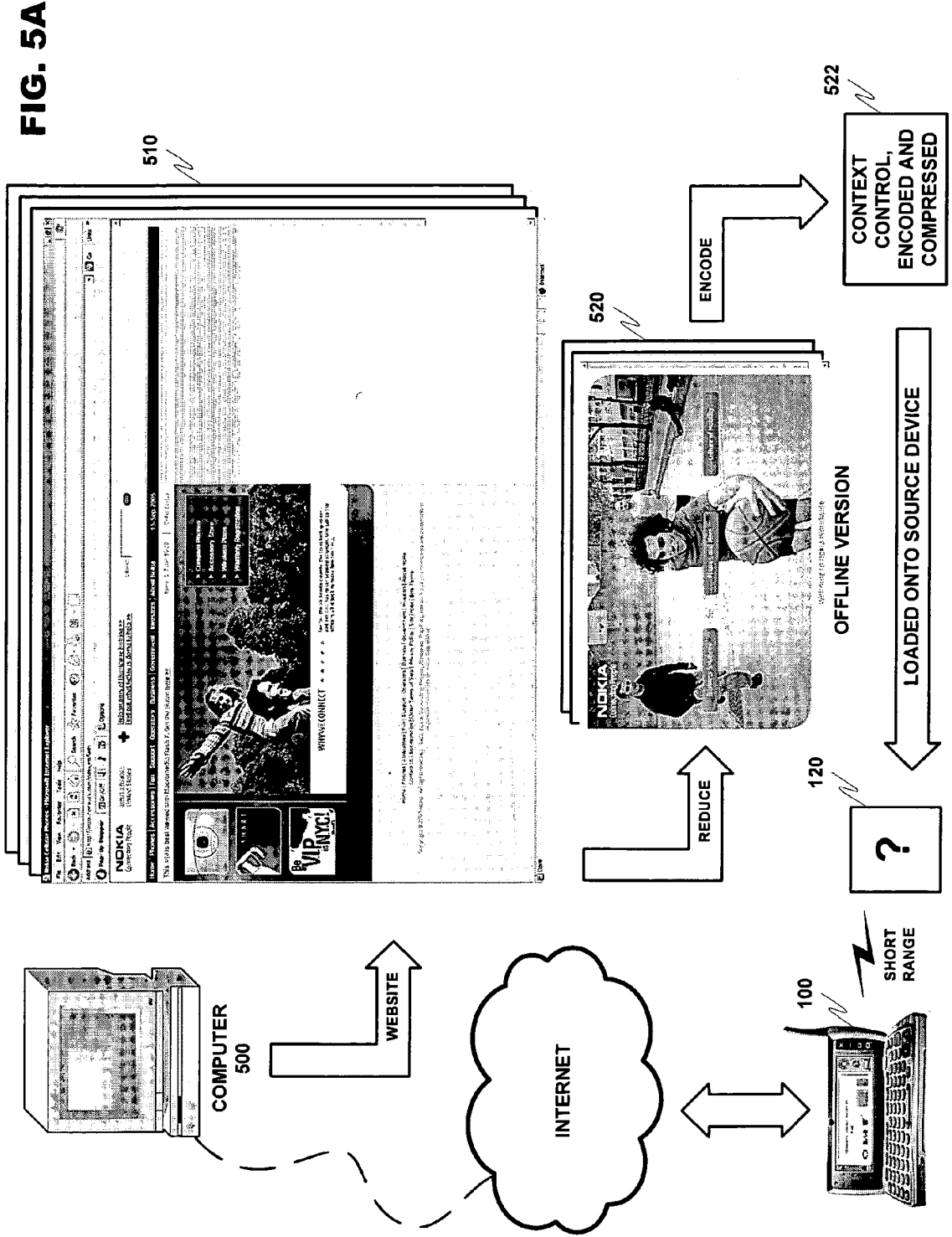

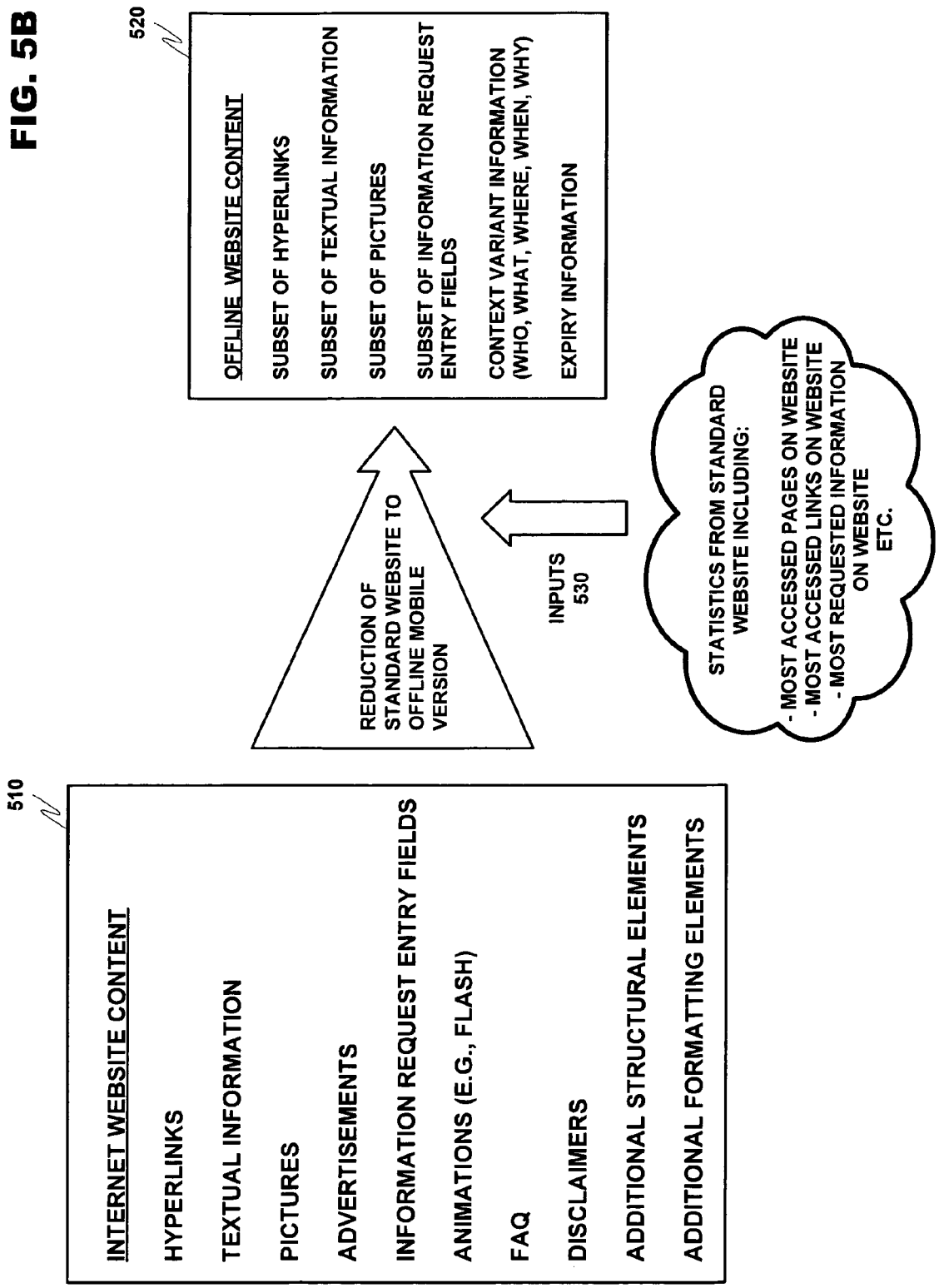

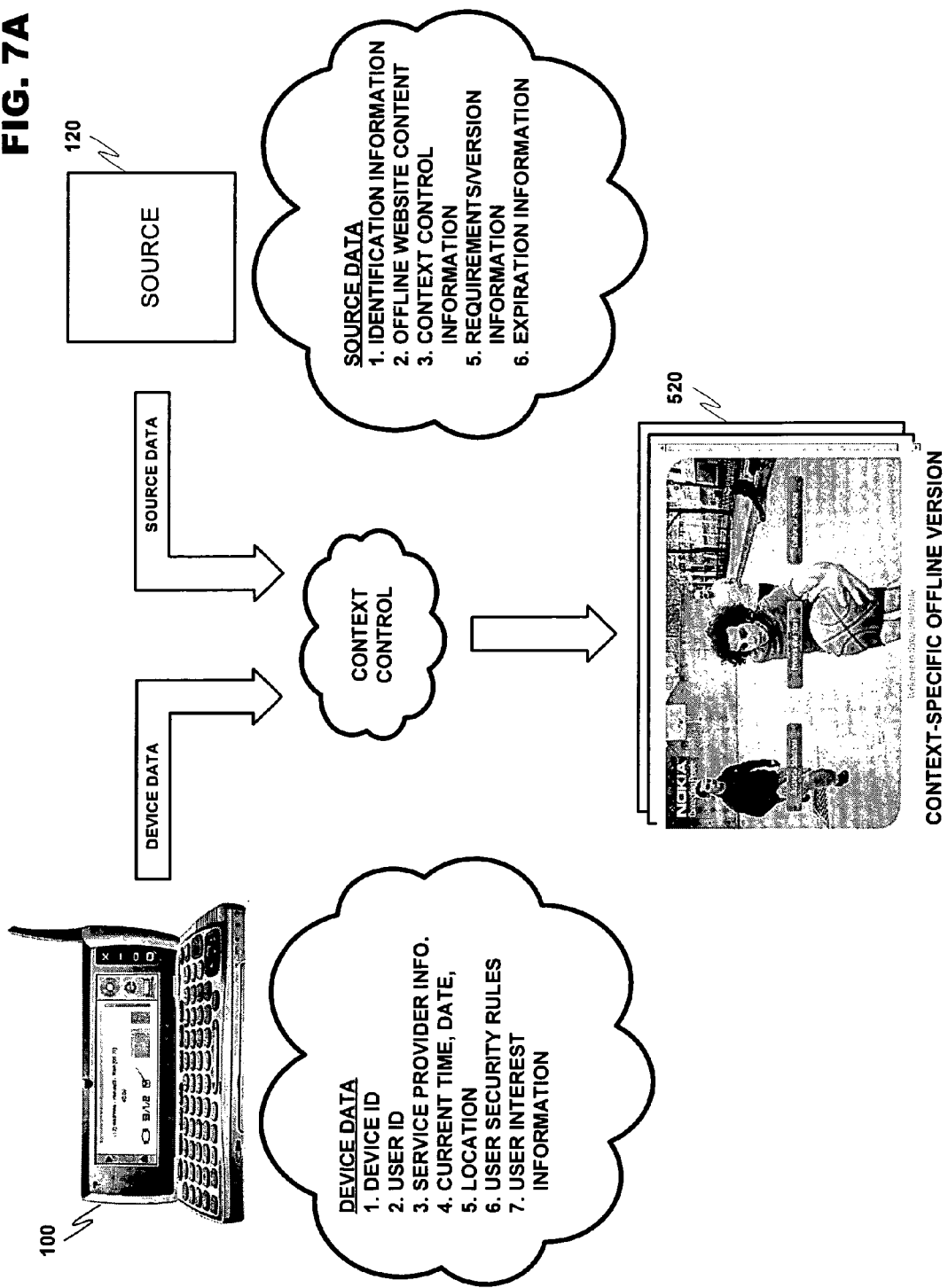

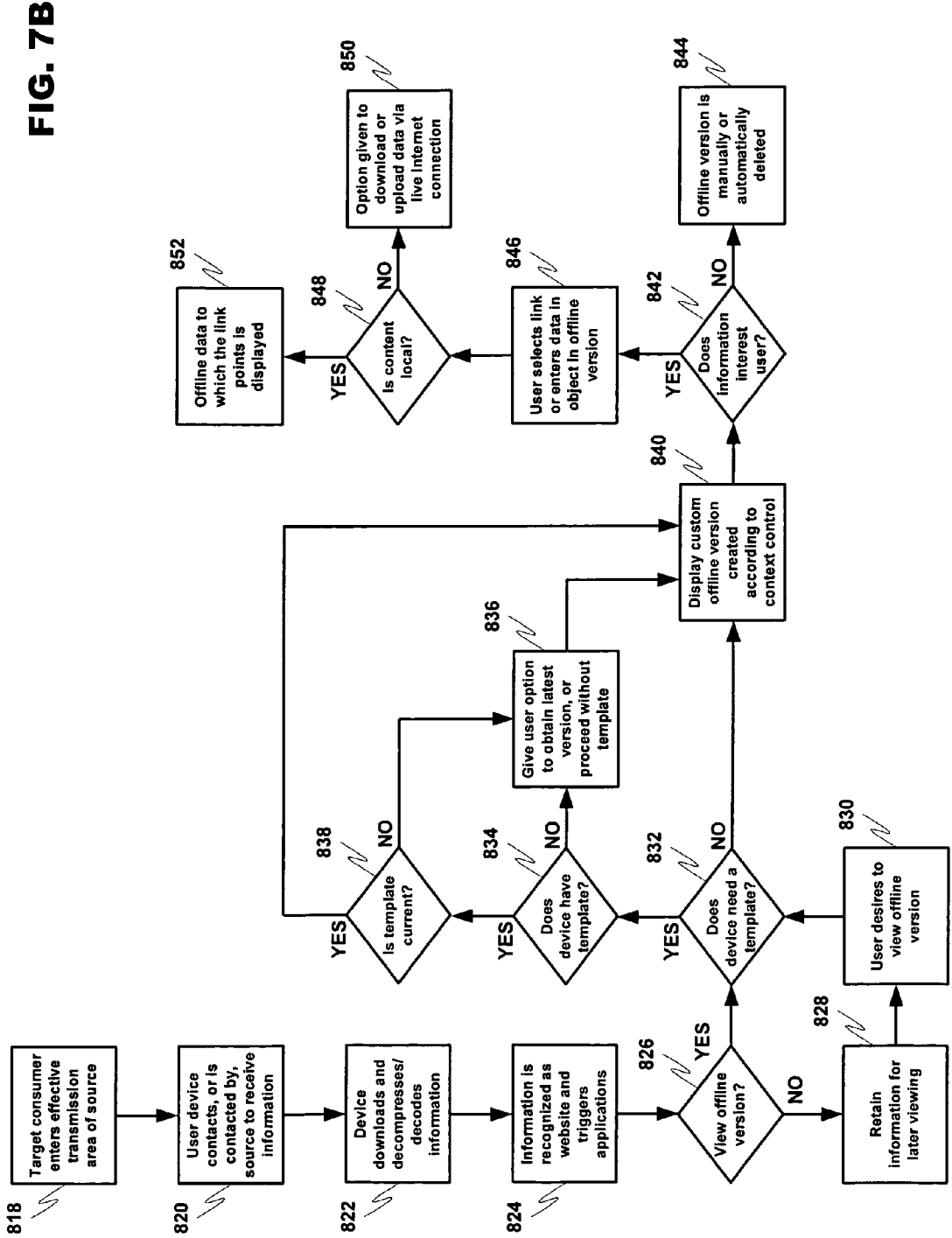

OFFLINE WEBPAGE ACTIVATED BY READING A TAG

BACKGROUND OF THE INVENTION

1. Field of Invention

The present invention relates to a system for delivering information to a device via wireless communication, and more specifically, to systems for delivering an offline version of a full-scale Internet website to the receiving device of a targeted consumer via short-range wireless communication.

2. Description of Prior Art

Modern society has quickly adopted, and become reliant upon, handheld devices for wireless communication. For example, cellular telephones continue to proliferate in the global marketplace due to technological improvements in both the quality of the communication and the functionality of the devices. These wireless communication devices (WCDS) have become commonplace for both personal and business use, allowing users to transmit and receive voice, text and graphical data from a multitude of geographical locations. The communication networks utilized by these devices span different frequencies and cover different broadcast distances, each having strengths desirable for various applications.

Cellular networks facilitate WCD communication over large geographic areas. These network technologies have commonly been divided by generations, starting in the late 1970s to early 1980s with first generation (1G) analog cellular telephones that provided baseline voice communications, to the now emerging 4G streaming digital video content planned for the 2006-2007 timeframe. GSM is an example of a widely employed 2G digital cellular network communicating in the 900 MHZ-1.8 GHZ band in Europe and at 1.9 GHZ in the United States. This network provides voice communication and also supports the transmission of textual data via the Short Messaging Service (SMS). SMS allows a WCD to transmit and receive text messages of up to 160 characters, while providing data transfer to packet networks, ISDN and POTS users at 9.6 Kbps. The Multimedia Messaging Service (MMS), an enhanced messaging system allowing for the transmission of sound, graphics and video files in addition to simple text, has also become available in certain devices. Soon emerging technologies such as Digital Video Broadcasting for Handheld Devices (DVB-H) will make streaming digital video, and other similar content, available via direct broadcast to a WCD. While long-range communication networks like GSM are a well-accepted means for transmitting and receiving data, due to cost, traffic and legislative concerns, these networks may not be appropriate for all data applications.

Short-range wireless networks provide communication solutions that avoid some of the problems seen in large cellular networks. Bluetooth™ is an example of a short-range wireless technology quickly gaining acceptance in the marketplace. A Bluetooth™ enabled WCD transmits and receives data at a rate of 720 Kbps within a range of 10 meters, and may transmit up to 100 meters with additional power boosting. A user does not actively instigate a Bluetooth™ network. Instead, a plurality of devices within operating range of each other will automatically form a network group called a "piconet". Any device may promote itself to the master of the piconet, allowing it to control data exchanges with up to seven "active" slaves and 255 "parked" slaves. Active slaves exchange data based on the clock timing of the master. Parked slaves monitor a beacon signal in order to stay synchronized with the master, and wait for an active slot to become available. These devices continually switch between various active communication and power saving modes in order to transmit data to other piconet members.

More recently, manufacturers have also began to incorporate various resources for providing enhanced functionality in WCDs (e.g., components and software for performing close-proximity wireless information exchanges). Sensors and/or scanners may be used to read visual or electronic information into a device. A transaction may involve a user holding their WCD in proximity to a target, aiming their WCD at an object (e.g., to take a picture) or sweeping the device over a printed tag or document. Machine-readable technologies such as radio frequency identification (RFID), Infra-red (IR) communication, optical character recognition (OCR) and various other types of visual, electronic and magnetic scanning are used to quickly input desired information into the WCD without the need for manual entry by a user.

The proliferation of wireless communication technology means that users have the ability to communicate without being restricted by time or location. This accessibility has created a desire for information providers (e.g., business, educational institutions, government, etc.) to tap into this potential. Currently, not only can a targeted consumer see an advertisement at a location (e.g., store, restaurant, mall, bus stop, train station, etc.), but at that moment when the user's interest is peaked, the user has the ability to use their WCD to contact the advertised business to get more information, place an order, enroll in a service plan, etc. Advertisers have attempted to facilitate this reaction by including electronic sources of information in close proximity to the visual advertisements. A user may then hold or scan their WCD near a printed barcode or target to download information relevant to the visual indicia. This information, may contain links to a website on the Internet, contact information (e.g., telephone numbers, email addresses, etc.), or other information that may be of further interest to a user.

Information providers, however, face a problem in that the targeted consumer is often only momentarily in range of an advertisement. For example, a person strolling through a shopping mall passes by a plethora of printed indicia, such as posters or commercial messages in a display case, and may only stop briefly to view each advertisement. Therefore, the effective communication time must be very short so that the user's interest will not be overcome by a long download time. Further, the user may not be motivated to download information that will require an "extra step" beyond the initial download. Even if the user is persuaded to obtain more information from an Internet website, many factors may exist that would prevent or discourage a user from establishing the online connection at that instant. Consequently, in order to achieve the advertising goal of the information provider, any information that is locally downloaded by a user to a WCD must be in a form to captivate the user's attention without additional effort.

What is needed is a system that can download website-like content to the device of a user that will provide relevant information in an offline mode. This content must be compact, but must also be interactive and able to provide the user enough information so that later when the user is in a more ideal situation, they will connect to the Internet in order to download additional information. The downloaded content should be able to inform the user in a manner that is context appropriate to the user's current situation. More specifically, the downloaded information should be variable so that it may be tailored to various environmental or user characteristics. In addition, the user should not have to intervene manually in order to put the downloaded content in a viewable condition, and if the user does not have any interest in the information provided by the content, it should be automatically deleted from their device.

SUMMARY OF INVENTION

The present invention consists of method, system, apparatus and computer program for communicating information from a source to a viewing device so that an offline version of information, such as in the form of a website, may be automatically viewed. The offline version of the website offers both immediate information of interest to a user, but also includes links to the Internet that may be accessed at the user's discretion. The offline version of the website may also include context-variable information that may change its behavior depending on various sensed characteristics.

The information to be communicated to the user may be an excerpt or subset of information found on a full-scale Internet website. This information may be manually or automatically converted into an offline version of the full-scale website based on various statistical measures of user activity on the website. The offline version, possibly composed of multiple condensed webpages, may then be compressed and/or encoded in a format that is totally passive, such as in printed indicia, or may be electronically installable on a source device. The source device may have the ability to communicate via one or more forms of short-range wireless communication.

A targeted consumer coming within transmission range of the source may manually or automatically download information from the source to a device. The receiving device may decode and/or decompress the downloaded information, which includes identification information that automatically triggers the use of standard software and/or hardware resources, such as a browser application, to recreate the offline version of the full-scale website. The offline version is viewable by the user, and the displayed content may be altered or customized by a context control which receives as an input current information from the downloaded software and the viewing device. That is, the offline version of the standard website may be altered depending on present characteristics read from, for example, the user's WCD. The user may view the information in the offline version, which may contain links (or other active components) to obtain further information, purchase an item, sign up for a service, etc. available when the device is actively connected to the Internet.

DESCRIPTION OF DRAWINGS

The invention will be further understood from the following detailed description of a preferred embodiment, taken in conjunction with appended drawings, in which:

FIG. 5A discloses an exemplary information processing and flow diagram in accordance with at least one embodiment of the present invention.

FIG. 5B discloses exemplary Internet and offline website structures in accordance with at least one embodiment of the present invention.

FIG. 7A discloses an exemplary information processing flow diagram disclosing the recreation of an offline version of a full-scale website in a device in accordance with at least one embodiment of the present invention.

FIG. 7B discloses a flowchart describing the offline website download and recreation process in accordance with at least one embodiment of the present invention.

DESCRIPTION OF PREFERRED EMBODIMENT

While the invention has been described in preferred embodiments, various changes can be made therein without departing from the spirit and scope of the invention, as described in the appended claims.

I. Obstacles Related to Information Distribution via Wireless Communication

Figure 1:
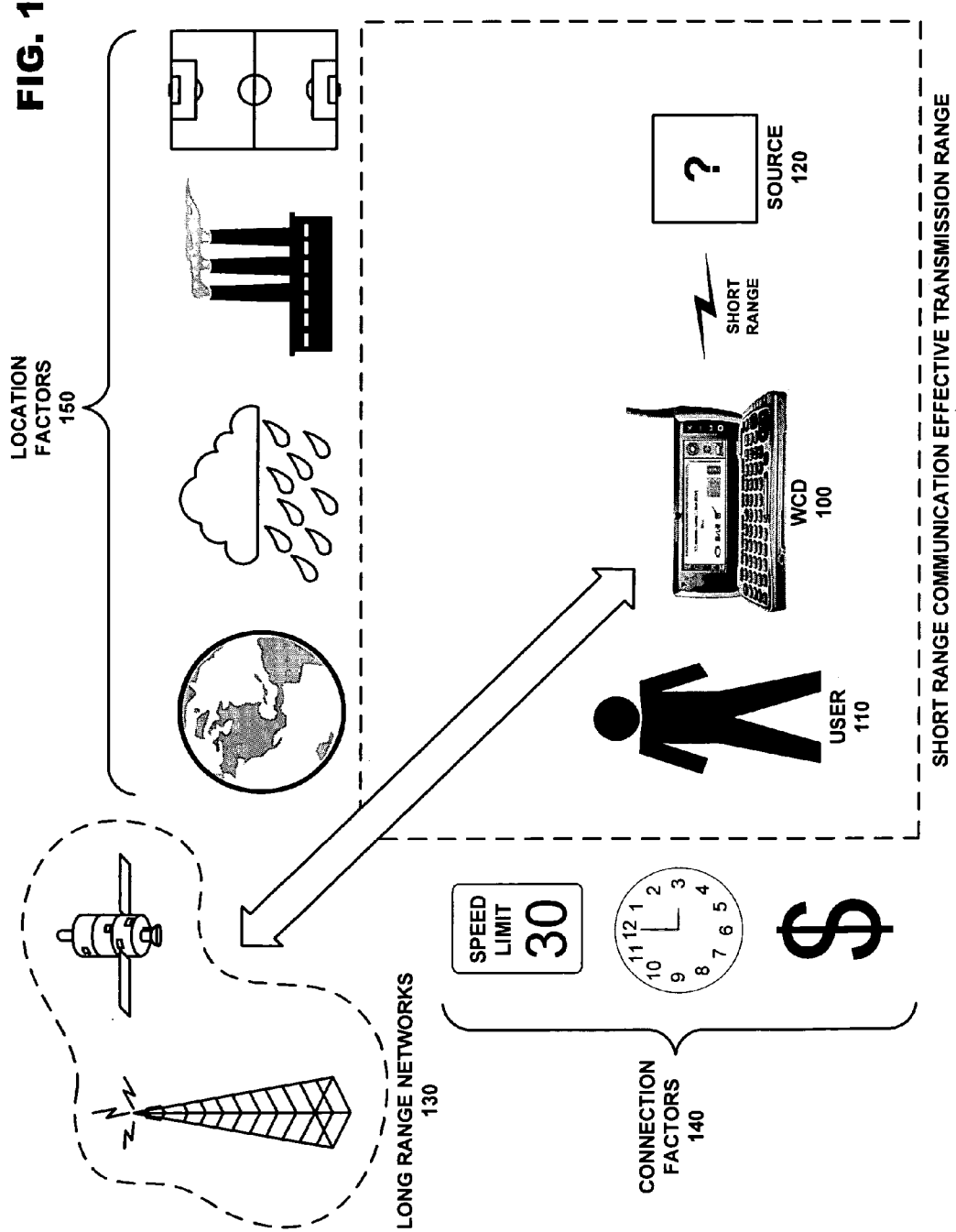
FIG. 1 discloses an exemplary short-range and long-range wireless communication scenario including possible barriers to communications.

FIG. 1 discloses the shortcomings associated with implementing an information distribution system that relies on a live wireless Internet connection to obtain information. User 110 is a person targeted by information providers (not pictured) to receive information. An information provider may be an advertiser, a governmental body, an educational entity, etc. User 110 carries a wireless communication device (WCD 100). User 110 is capable of consuming information by using WCD 100 to receive information from source 120. Source 120 is any object capable of conveying information, via a multitude of methods, over a short distance. In an exemplary situation, User 110 may be in a location where printed indicia indicates a topic of interest. Source 120 is also in this area, and may be automatically located, by WCD 100, or may be visually indicated as a source of information. WCD 100 may then communicate with the source 120 via short-range communication in order to obtain information as depicted in FIG. 1.

If user 110 sees something of interest, they may initiate a download of information from source 120 to WCD 100. Due to the time, speed and/or memory restrictions of current short-range communication technology, the information downloaded to WCD 100 usually consists of only pointers to more substantial information. These pointers may include phone numbers, email addresses, SMS addresses, links to web pages, etc. Therefore, there is currently a necessity to use these pointers to obtain the actual information that user 110 desires. In FIG. 1, WCD 100 may communicate with long range networks 130, but must also account for, or overcome, connection factors 140 and location factors 150.

Connection factors 140 include characteristics that influence a user's decision whether or not to connect to long range networks 130. These characteristics include, but are not limited to, speed factors, time factors and financial factors. For example, user 110 may not want to pursue a wireless internet connection allowing them to download additional information about a product, service, etc. if the connection speed is slow. The speed of the connection may directly or indirectly effect the other factors. A slow connection would necessarily increase the time of the connection in order to obtain the desired information. Consequently, the more time required for the connection, the more expense user 110 may incur from their wireless service provider.

Location factors also influence whether user 110 will pursue additional information relevant to a content downloaded from source 120 in that the location of user 110 will directly impact their ability to connect to long-range networks. If user 110 is geographically distant from their home operating area, they may not be able to connect wirelessly to the Internet, or may only be able to connect at an additional cost, in order to download additional information. Natural and man-made atmospheric interference may completely prevent a user from connecting to a long-range network. Factors such as bad weather and industrial pollution (e.g., air pollution, electromagnetic field emissions) may disrupt long range wireless communications. In addition, WCD 100 may not be able to obtain a signal if the user is inside a building, such as an office, store, subway, shopping mall or sports arena.

All of these factors contribute to prevent a user from immediately contacting a long range network. In this way, the information provider loses the ability to capitalize on the immediate short-range communication when user 110 is at the peak of interest. User 110 must then wait for a more convenient time to obtain the further information related to the downloaded pointer or link data, risking a loss of interest and lack of execution on the part of the targeted consumer. This is the situation alleviated by the present invention.

II. Wireless Communication Device

The present invention may be utilized with a variety of information receiving devices. The device may vary in complexity from a simple cellular telephone all the way up to a desktop computer. Therefore, it is first important to understand the communication tools available to users 110 before exploring the present invention. For example, in the case of a cellular telephone or other handheld wireless communicator, the data handling capabilities of wireless communication device plays an important role in the transaction between the information provider and the user 110.

Figure 2:
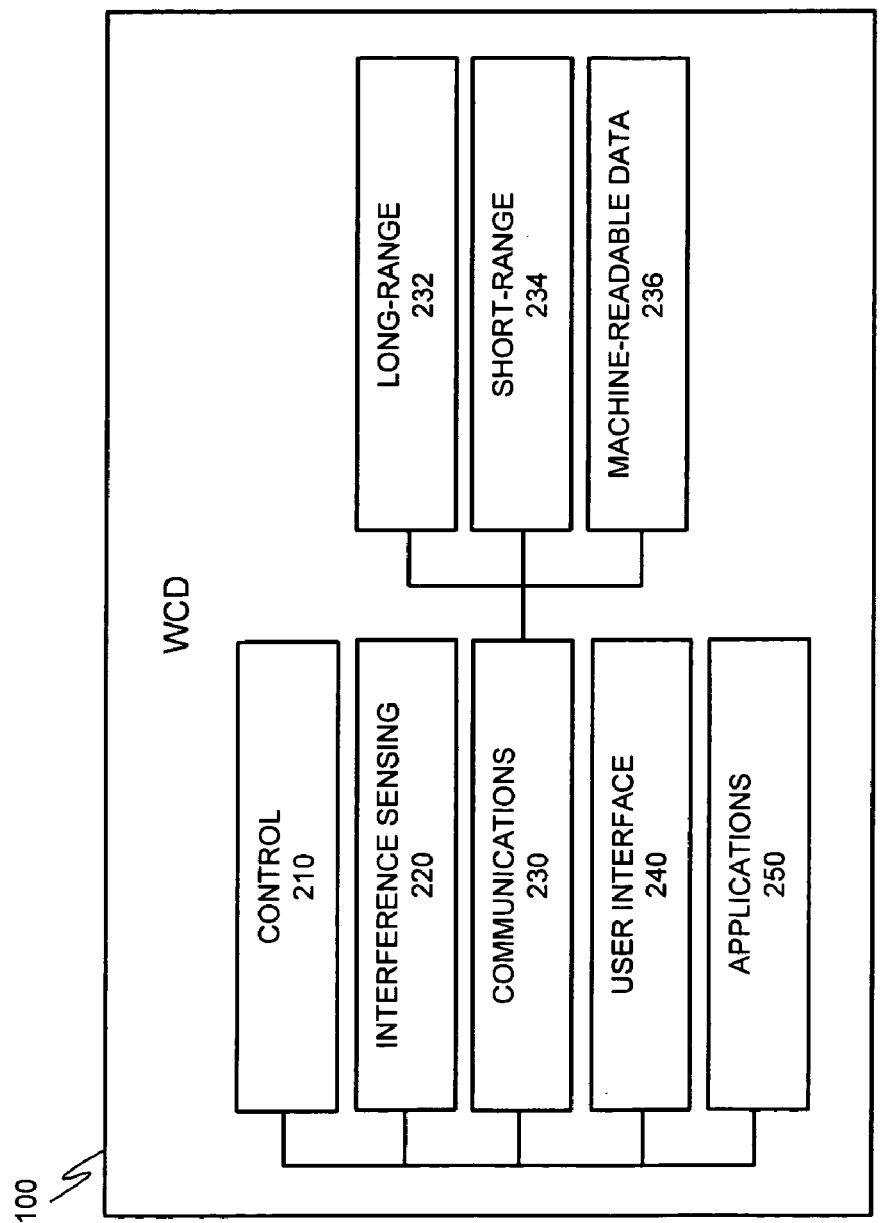
FIG. 2 discloses a modular description of an exemplary wireless communication device usable with at least one embodiment of the present invention.

FIG. 2 discloses an exemplary modular layout for a wireless communication device usable with the instant invention. WCD 100 is broken down into modules representing the functional aspects of the device. These functions may be performed by the various combinations of software and/or hardware components discussed below.

Control module 210 regulates the operation of the device. Inputs may be received from various other modules included within WCD 100. For example, interference sensing module 220 may use various techniques known in the art to sense sources of environmental interference within the effective transmission range of the wireless communication device. Control module 210 interprets these data inputs and in response may issue control commands to the other modules in WCD 100.

Communications module 230 incorporates all of the communications aspects of WCD 100. As shown in FIG. 2, communications module 230 includes, for example, long-range communications module 232, short-range communications module 234 and machine-readable data module 236. Communications module 230 utilizes at least these sub-modules to receive a multitude of different types of communication from both local and long distance sources, and to transmit data to recipient devices within the broadcast range of WCD 100. Communications module 230 may be triggered by control module 210 or by control resources local to the module responding to sensed messages, environmental influences and/or other devices in proximity to WCD 100.

User interface module 240 includes visual, audible and tactile elements which allow the user of WCD 100 to receive data from, and enter data into, the device. The data entered by the user may be interpreted by control module 210 to affect the behavior of WCD 100. User inputted data may also be transmitted by communications module 230 to other devices within effective transmission range. Other devices in transmission range may also send information to WCD 100 via communications module 230, and control module 210 may cause this information to be transferred to user interface module 240 for presentment to the user.

Applications module 250 incorporates all other hardware and/or software applications on WCD 100. These applications may include sensors, interfaces, utilities, interpreters, data applications, etc., and may be invoked by control module 210 to read information provided by the various modules and in turn supply information to requesting modules in WCD 100.

Figure 3:
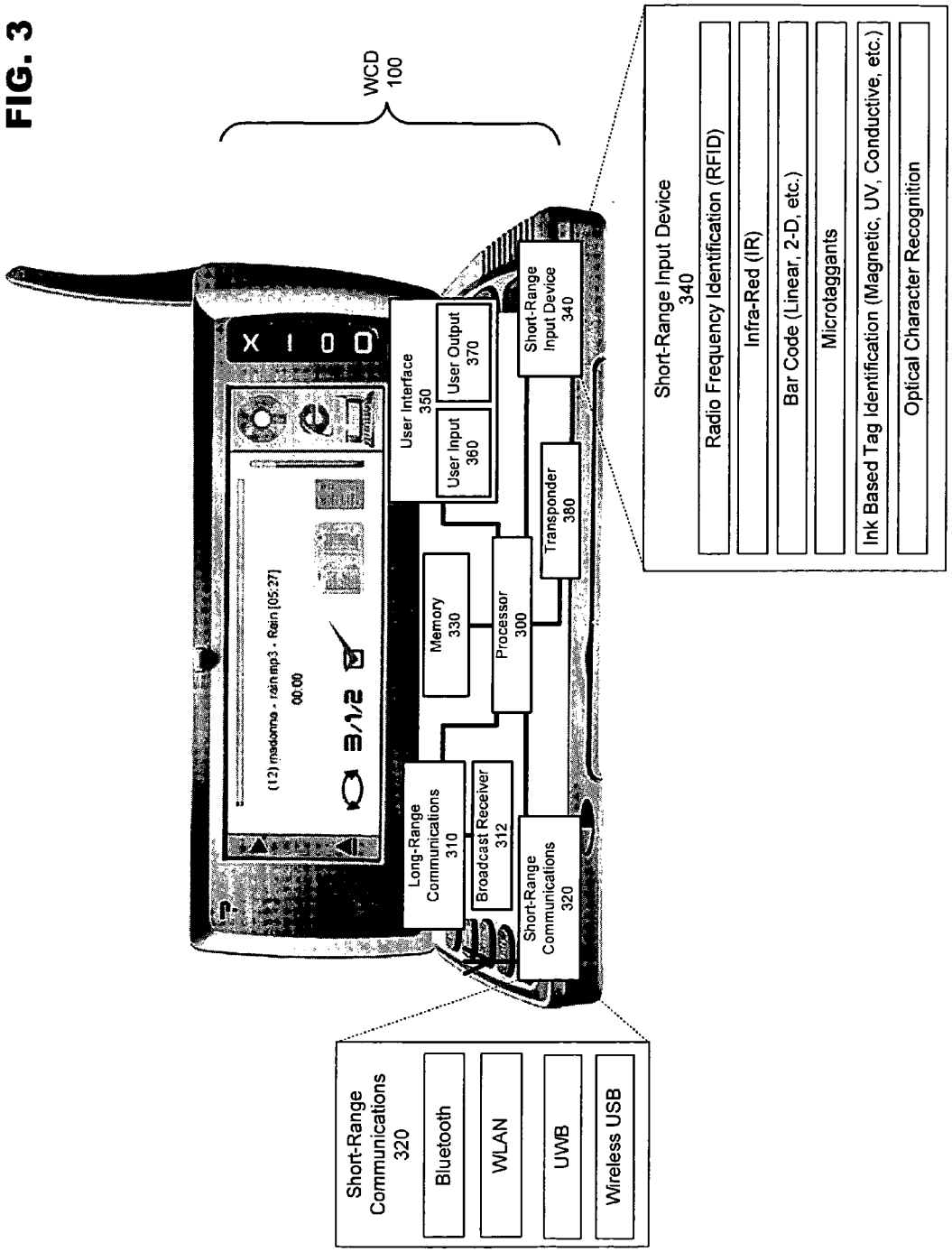
FIG. 3 discloses a structural description of the exemplary wireless communication device previously described in FIG. 2.

FIG. 3 discloses an exemplary structural layout of WCD 100 according to an embodiment of the present invention that may be used to implement the functionality of the modular system previously described. Processor 300 controls overall device operation. As shown in FIG. 3, processor 300 is coupled to communications sections 310, 320 and 340. Processor 300 may be implemented with one or more microprocessors that are each capable of executing software instructions stored in memory 330.

Memory 330 may include random access memory (RAM), read only memory (ROM), and/or flash memory, and stores information in the form of data and software components (also referred to herein as modules). The data stored by memory 330 may be associated with particular software components. In addition, this data may be associated with databases, such as a bookmark database or a business database for scheduling, email, etc.

The software components stored by memory 330 include instructions that can be executed by processor 300. Various types of software components may be stored in memory 330. For instance, memory 330 may store software components that control the operation of communication sections 310, 320 and 340. Memory 330 may also store software components including a firewall, a service guide manager, a bookmark database, user interface manager, and any communications utilities modules required to support WCD 100.

Long-range communications 310 performs functions related to the exchange of information over large geographic areas (such as cellular networks) via an antenna. These communication methods include technologies from the previously described 1G to 3G and soon fourth generation streaming video transmission. In addition to basic voice communications (e.g., via GSM), long-range communications 310 may operate to establish data communications sessions, such as General Packet Radio Service (GPRS) sessions and/or Universal Mobile Telecommunications System (UMTS) sessions. Also, long-range communications 310 may operate to transmit and receive messages, such as short messaging service (SMS) messages and/or multimedia messaging service (MMS) messages.

As a subset of long-range communications 310, or alternatively operating as an independent module separately connected to processor 300 (not pictured), broadcast receiver 312 allows WCD 100 or receive broadcast messages via mediums such as Digital Video Broadcast for Handheld Devices (DVB-H). These transmissions may be encoded so that only certain designated receiving devices may access the broadcast content, and may contain text, audio or video information. In at least one example, WCD 100 may receive these broadcasts and use information contained within the broadcast signal to determine if the device is permitted to view the received content.

Short-range communications 320 is responsible for functions involving the exchange of information across short-range wireless networks. As described above and depicted in FIG. 3, examples of such short-range communications 320 are not limited to Bluetooth™, WLAN, UWB and Wireless USB connections. Accordingly, short-range communications 320 performs functions related to the establishment of short-range connections, as well as processing related to the transmission and reception of information via such connections.

Short-range input device 340, also depicted in FIG. 3, may provide functionality related to the short-range scanning of machine-readable data. For example, processor 300 may control short-range input device 340 to generate RF signals for activating an RFID transponder, and may in turn control the reception of signals from an RFID transponder. Other short-range scanning methods for reading machine-readable data that may be supported by the short-range input device 340 are not limited to IR communications, linear and 2-D (e.g., QR) bar code readers (including processes related to interpreting UPC labels), and optical character recognition devices for reading magnetic, UV, conductive or other types of coded data that may be provided in a tag using suitable ink. In order for the short-range input device 340 to scan the aforementioned types of machine-readable data, the input device may include optical detectors, magnetic detectors, CCDs or other sensors known in the art for interpreting machine-readable information.

As further shown in FIG. 3, user interface 350 is also coupled to processor 300. User interface 350 facilitates the exchange of information with a user. FIG. 3 shows that user interface 350 includes a user input 360 and a user output 370. User input 360 may include one or more components that allow a user to input information. Examples of such components include keypads, touch screens, and microphones. User output 370 allows a user to receive information from the device. Thus, user output portion 370 may include various components, such as a display, light emitting diodes (LED), tactile emitters and one or more audio speakers. Exemplary displays include liquid crystal displays (LCDs), and other video displays.

WCD 100 may also include transponder 380. This is essentially a passive device which may be programmed by processor 300 with information to be delivered in response to a scan from an outside source. For example, an RFID scanner mounted in a entryway may continuously emit radio frequency waves. When a person with a device containing transponder 380 walks through the door, the transponder is energized and may respond with information identifying the device, the person, etc.

Hardware corresponding to communications sections 310, 312, 320 and 340 provide for the transmission and reception of signals. Accordingly, these portions may include components (e.g., electronics) that perform functions, such as modulation, demodulation, amplification, and filtering. These portions may be locally controlled, or controlled by processor 300 in accordance with software communications components stored in memory 330.

The elements shown in FIG. 3 may be constituted and coupled according to various techniques in order to produce the functionality described in FIG. 2. One such technique involves coupling separate hardware components corresponding to processor 300, communications sections 310, 312 and 320, memory 330, short-range input device 340, user interface 350, transponder 380, etc. through one or more bus interfaces. Alternatively, any and/or all of the individual components may be replaced by an integrated circuit in the form of a programmable logic device, gate array, ASIC, multi-chip module, etc. programmed to replicate the functions of the stand-alone devices. In addition, each of these components is coupled to a power source, such as a removable and/or rechargeable battery (not shown).

The user interface 350 may interact with a communications utilities software component, also contained in memory 330, which provides for the establishment of service sessions using long-range communications 310 and/or short-range communications 320. The communications utilities component may include various routines that allow the reception of services from remote devices according to mediums such as the Wireless Application Medium (WAP), Hypertext Markup Language (HTML) variants like Compact HTML (CHTML), etc.

When engaging in WAP communications with a remote server, the device functions as a WAP client. To provide this functionality, the software components may include WAP client software components, such as a Wireless Markup Language (WML) Browser, a WMLScript engine, a Push Subsystem, and a Wireless Medium Stack.

Applications (not shown) may interact with the WAP client software to provide a variety of communications services. Examples of such communications services include the reception of Internet-based content, such as headline news, exchange rates, sports results, stock quotes, weather forecasts, multilingual phrase dictionaries, shopping and dining information, local transit (e.g., bus, train, and/or subway) schedules, personal online calendars, and online travel and banking services.

The WAP-enabled device may access small files called decks which each include smaller pages called cards. Cards are small enough to fit into a small display area that is referred to herein as a microbrowser. The small size of the microbrowser and the small file sizes are suitable for accommodating low memory devices and low-bandwidth communications constraints imposed by wireless links.

Cards are written in the Wireless Markup Language (WML), which is specifically devised for small screens and one-hand navigation without a keyboard. WML is scaleable so that it is compatible with a wide range of displays that covers two-line text displays, as well as large LCD screens found on devices, such as smart phones, PDAs, and personal communicators. WML cards may include programs written in WMLScript, which is similar to JavaScript. However, through the elimination of several unnecessary functions found in these other scripting languages, WMLScript reduces memory and processing demands.

CHTML is a subset of the standard HTML command set adapted for use with small computing devices (e.g., mobile communicator, PDA, etc.). This language allows portable or handheld devices interact more freely on the Internet. CHTML takes into consideration the power, processing, memory and display limitations of small computing devices by stripping down standard HTML to a streamlined version suitable for these constraints. For example, many of the more advanced image maps, backgrounds, fonts, frames, and support for JPEG images have been eliminated. Further, scrolling is not supported because it is assumed that CHTML displays will fit within the screen of a portable device. CHTML has also been designed to operated without two dimensional cursor movement. Instead, it may be manipulated with only four buttons, which facilitates its implementation over a larger category of small computing devices.

III. Short-range Tag Interaction

Figure 4:
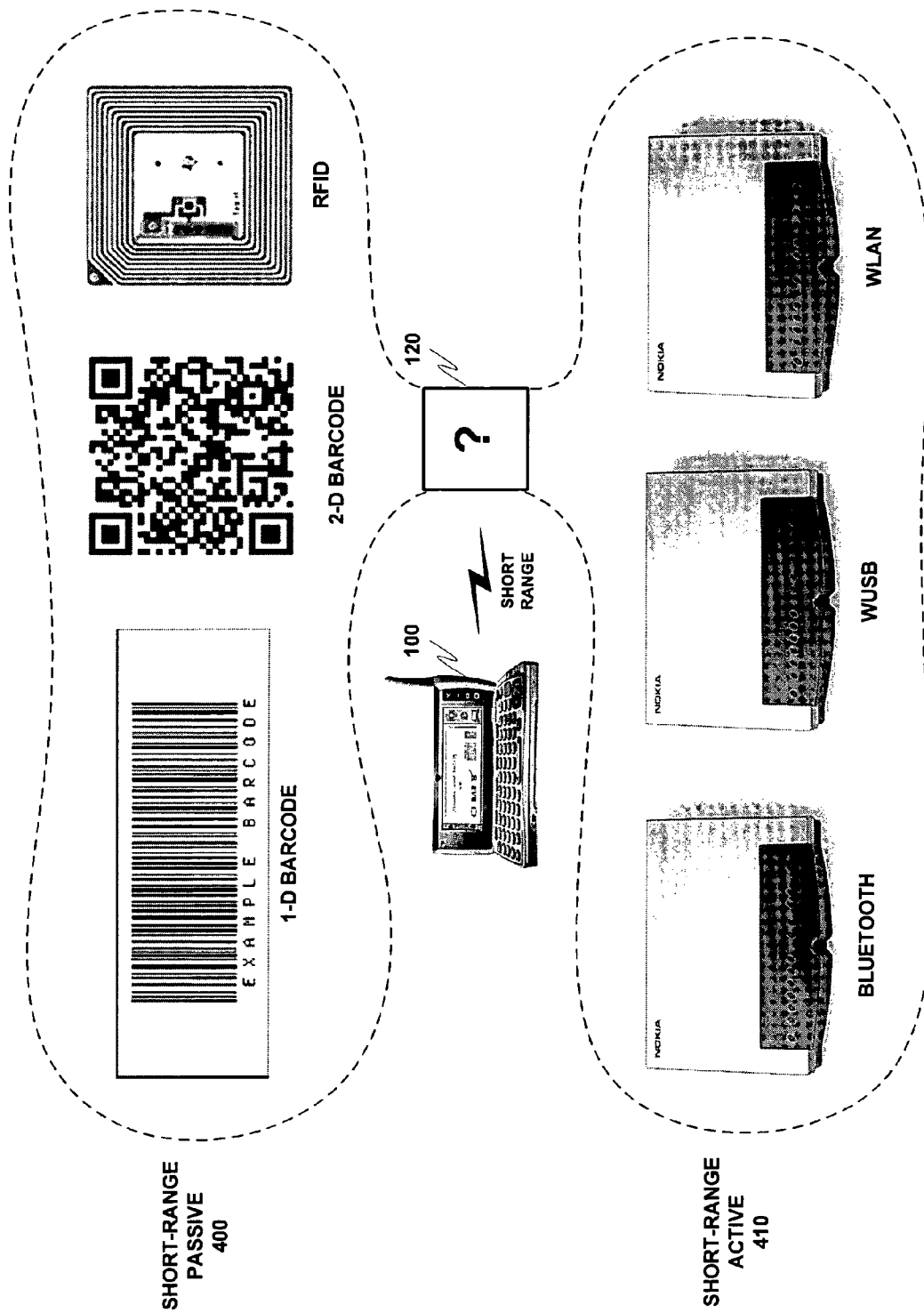
FIG. 4 discloses exemplary short-range passive and active wireless information sources in accordance with at least one embodiment of the present invention.

The present invention improves on current communication methods involving short-range wireless interactions between a device and a source. Many mediums exist to enable this transaction. FIG. 4 discloses an exemplary array of some of these mediums in two categories: Short-range passive 400 and Short-range active 410.

Short-range passive devices, or tags, require an initial action by a device in order to relay information. The most basic tags are printed tags, such as barcodes. A one-dimensional (1-D) barcode is the most common type. Depending on the symbology employed, these codes can convey up to approximately 40 to 50 alphanumeric characters through the use of simple scanners. 1-D barcodes are most commonly employed in identifying objects, for example, as UPC symbols indicating the identity of commercial products. Two dimensional (2-D) barcodes (e.g., QR codes) can store more data, but require special scanners that are able to read simultaneously in two directions. The amount of data conveyed depends on the redundancy level employed. For example, a 57×57 QR array employing low-redundancy can convey approximately 395 alphanumeric characters. One drawback of printed tags is that it requires very close proximity and some accuracy in moving a scanner across a tag. Electronic tags, such as RFID tags, overcome some of these obstacles by merely requiring that the scanning device be in transmission range of the RFID transponder. Further, RFID transponders can store and transmit more information than the typical bar code, ranging from a mere 96 bits to over a megabit or 125 Kbytes. However, an electronic tag is still somewhat limited overall by the size of its memory and transmission range. While exemplary bar-code and radio-frequency technologies have been disclosed, the present invention is not limited to these communication mediums. The present invention also anticipates the use of any optical, magnetic, capacitive, IR based, RF based, visible or non-visible codes, or any other similar technology.

Short-Range Active 410 is a group that may consist of wireless access points capable of forming either a direct one-to-one connection, or a network including a receiving device, in order to transfer information. These access points may use any of a plurality of short-range network technologies such as Bluetooth™, Wireless Universal Serial Bus (WUSB), Wireless Local Area Networking (WLAN), etc. These active connection points benefit from extended transmission range and, in some cases, no need for manual interaction from user 110 in order to form the connection. For example, user 110 needs merely to come within range of a Bluetooth™ access point in order to automatically become a member of a piconet from which information may be downloaded. Communication mediums in the short-range active 410 category are only limited by the time it takes to establish a connection and download the information. Similar to the short-range passive devices, the active communication mediums disclosed above are offered only as an example. The present invention may also utilize other wireless short-range communication mediums operating in a similar manner.

IV. Conveying Desired Information in Accordance with the Present Invention

FIG. 5A describes at least one embodiment of the present invention. The end goal of the information provider is to preserve the interest of user 110 until they are able to download additional information from the Internet. This information is usually accessible via computer 500 in the form of full-scale Internet website 510. Website 510, while conveying important information, may consist of many individual webpages that are too large and complex to both store and convey to, for example, a mobile device (WCD 100) in an offline mode. It may also contain objects, such as animations, that require active connection to the Internet. Therefore, in this example the information provider may reduce or simplify the full-scale website 510 into offline version 520.

Offline version 520 may include rudimentary information, in one or more pages, that will inform a target consumer in a manner to preserve interest in the content. Such content may include a GIF image, textual information links to get further information. Interactive content may also include information entry objects. Entered information may be sent to an information provider via email, SMS, MMS, etc. Alternatively, offline version 520 may consist of a resident template forming a framework wherein only the content data is updated. This information may include data updated periodically such as television programming information, bus schedules, sports scores, etc. The content of the offline version 520 of the full-scale website is limited by the ability of the language used (e.g., HTML, CHTML, etc.), the anticipated abilities of the viewing device, the characteristics of the method of conveyance, such as the communication medium, memory size, speed, etc. of source 120.

Once the offline version 520 of the standard website is established, the information is combined with context control information, and the combined information is encoded and/or compressed and loaded into source 120 (shown at 522). The encoding and compression process depends both on source 120 and the receiving device (in this case WCD 100). The information may have to be compressed in order to fit it on the source device, but the technology must also exist on WCD 100 to be able to uncompress and read the data. The compressed version 522 of the offline version may also include identification information allowing WCD 100 to automatically determine that it contains a website. WCD 100 would then be able to automatically trigger the appropriate software, such as a browser application, to recreate and display the mobile device offline version of the website. Source 120 is then placed in a area containing pedestrian traffic, allowing user 110 to access its content.

User 110 then downloads the information contained in source 120 through visual inducement, automatic download, etc. The information may automatically be identified and interpreted via various applications on WCD 100 such as decompression software, interpreters for tag data, context application software, HTML or CHTML generation applications, browser applications, etc. The information contained in the offline version 520 will serve to inform the user, and any Internet links provided will allow a user to obtain or submit additional information when the user decides to access the Internet. The information displayed by the device to user 110 may further be controlled by context characteristics. The notion of context and its effect on the present invention will be discussed further in relation to FIG. 5B.

FIG. 5B includes a more detailed discussion of the conversion of the full-scale Internet website 510 into offline version 520. An information provider may first divide the content of full-scale Internet website 510 into categories. Some of these categories (e.g., animations, structural and formatting elements, etc.) cannot be included in the offline version 520 due to limitations in the scripting language. Otherwise, subsets of other categories may be included directly or in a size-reduced format. The decision to include certain items may be determined by inputs 600. Through a manual or automated process, standard website statistics may be examined to determine the content or categories of most interest to user 110. These statistics include, but are not limited to, most accessed pages on a website, most accessed links on a website, most requested information on a website, etc.

Further, context variant information may be included to control the appearance or behavior of information in offline version 520. In the Internet website 510, an information provider may easily update the content of the website online depending on a number of characteristics: date, time of day, location, identity of information consumer, identity of communication device, special interests of an information consumer, etc. However, offline version 520 is often static content that is infrequently updated. The information may be stored on a passive device that is not actively connected to a communication medium accessible by the information provider. Therefore, context controls may be included to control the look of the information, for example, as if it had been recently updated. Exemplary context variables such as time and location may be read from resources within WCD 100. These variables may determine, for example, that a certain event pertains to the current location of WCD 100 and should be displayed, an event has already transpired and should not be displayed, an offer or special pertains to the current time of day, user 110 is a particular user that would be interested in certain information due to a certain device or service provider, etc.

Figure 5C:
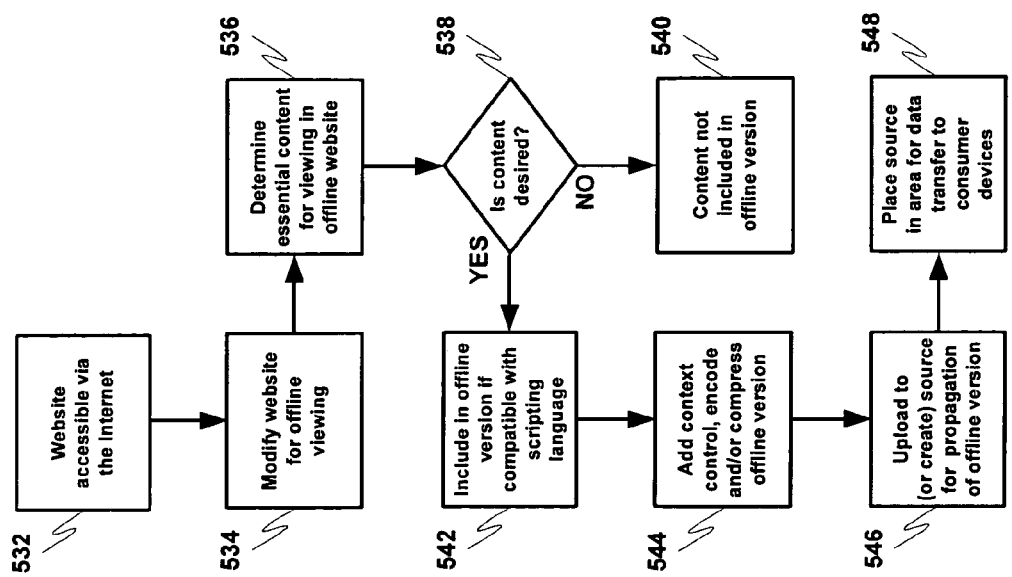
FIG. 5C discloses a flowchart describing the offline version creation process in accordance with at least one embodiment of the present invention.

FIG. 5C discloses a process flow chart for preparing the information that will later be downloaded to a viewing device in accordance with at least one embodiment of the present invention. Step 532 begins with a full-scale Internet website. The information provider may then modify the website to convert it into a version suitable for offline viewing in step 534. In order to perform the conversion, a determination must be made whether specific content from the website should be retained (step 536). In steps 538-542, the information provider determines whether information is desired or extraneous. If certain information is desired (possibly determined by web site traffic statistics) the content is retained in the offline version, provided that the content is supported by the scripting language (e.g., CHTML) in use. If the information is outside the ability of the scripting language, or deemed to be extraneous, it is not included in the offline version. In step 544, context control is combined with the streamlined website content, and the complete offline version is encoded and/or encrypted so that it may be uploaded to a source device. The encoding and/or encrypting of the information may include identification information that allows a viewing device to automatically determine that the downloaded content is website content. After the encoded and/or encrypted information is uploaded to a source (or created, as in the case of printed machine-readable indicia) in step 546, the source is then placed in an area to perpetuate data transfer to targeted user devices (step 548).

Figure 6:
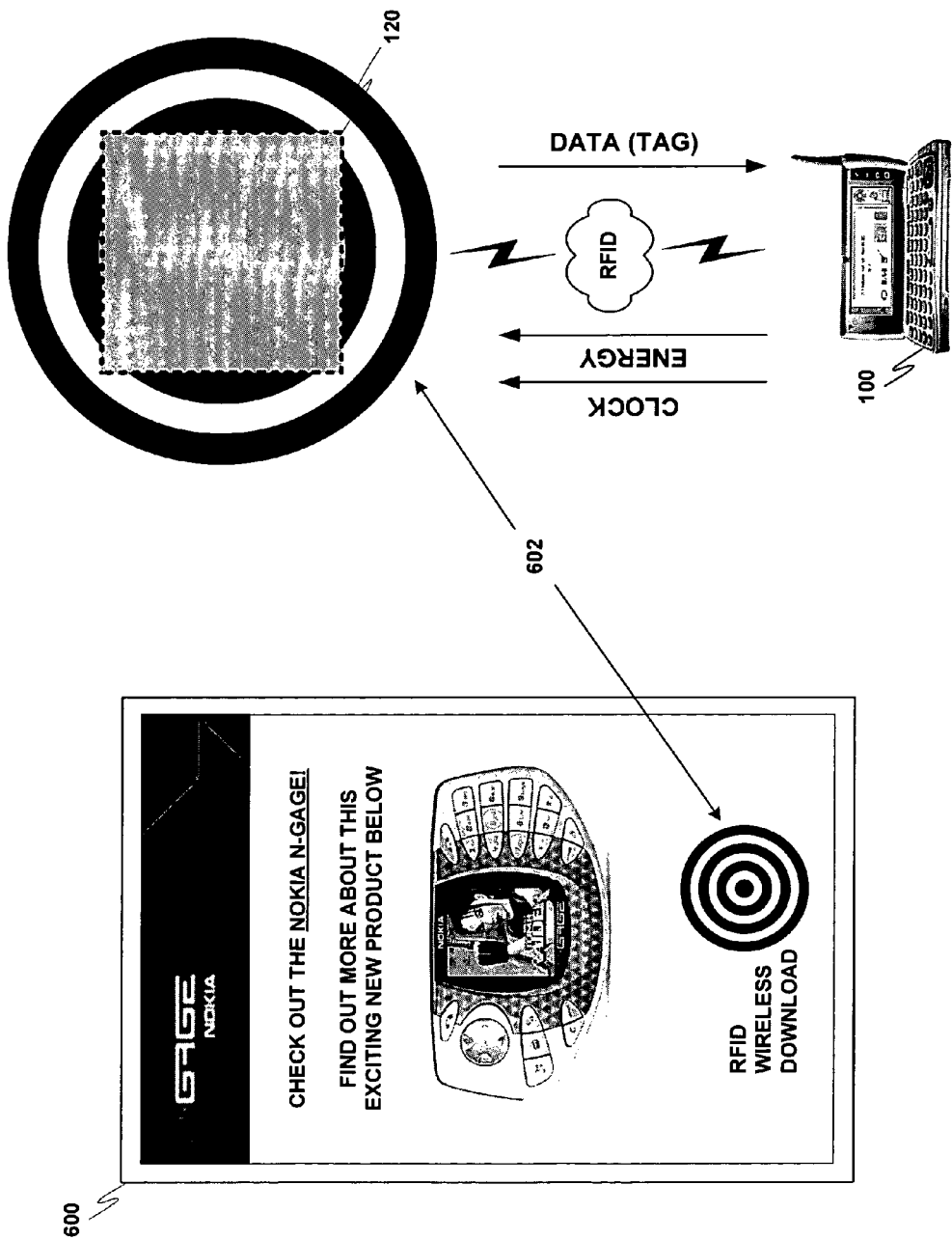
FIG. 6 discloses an exemplary information transaction via short-range wireless communication in accordance with at least one embodiment of the present invention.

FIG. 6 discloses an exemplary installation of source 120 as a passive distribution device in conjunction with visual indicia. Display 600 may be a billboard, poster, standee, light box sign, etc. containing indicia of an entertaining, educational, or informative nature. In the example of FIG. 6, display 600 is advertising a new product. Display 600 also indicates that information is available for wireless download via RFID communication from target 602. Target 602 includes source 120, which in this case is an RFID transponder. Source 120 may be affixed to display 600 through various known means of attachment. The RFID transponder includes a memory which stores the information to be downloaded to a user device. In this exemplary situation, user 110 holds WCD 100 in close proximity to target 602 so that it may be scanned. WCD 100 emits an RF scan signal providing energy and a clock synchronization signal to source 120. Source 120 uses the supplied power to send data back to WCD 100. The information may then be processed by WCD 100 so that it may be viewed as offline version 520 by user 110.

Other receiving devices and applications are anticipated in addition to the above. The user may also use a similar technique to download information to their home desktop or laptop computer. User 110 may, for example, be reading a magazine that contains information encoded in a bar code or transponder. A scanner, attached to the home computer of the user, may then be used to scan this information into the computer for automated viewing as an offline website. In this way, a user may automatically input desired information into a computer without having to be actively connected to the Internet. This process is suited for many applications including, but not limited to, television programming information, consumer product specification information, pharmaceutical information, coupon or other special promotion information, event information, application or enrollment information, terms and conditions information, etc.

The recreation of the offline version of the full-scale website on a receiving device is disclosed pictorially in FIG. 7A. Source 120 provides information to a receiving device (in this case WCD 100). The source data may include, but is not limited to, identification information, offline website content, context control information, requirements/version information, and expiration information. The identification information is used by the receiving device to identify the downloaded information as a website, which may automatically trigger the start of appropriate device resources to prepare the offline website for viewing. The context control may then, in accordance with information received from both the receiving device (WCD 100) and source 120, custom tailor the appearance and functionality of the offline version 520 based on current device and environmental characteristics. The context control may, for example, use the requirement/version information to determine if a required viewing template is resident on the WCD 100. The lack of a template, or the presence of a obsolete template, may result in a prompt to user 110 for some action before displaying the website content. Alternatively, the device identification, user identification, service provider information, current time and date, location information, security rules and/or interest information set by the user, etc. may be read from WCD 100 in order to customize the behavior offline version 520. This information may be used to withhold expired offers, present time-specific or location-specific offers, advertise certain services only available to customers of a particular service provider, etc.

The exemplary process previously described in FIG. 7A is disclosed in flowchart form in FIG. 7B. In step 818, the targeted information consumer (user 110) enters the effective transmission range of source 120. WCD 100 then contacts, or is contacted by in the case of some active networks, source 120 (step 820) and then downloads information from the source. Any decompression and/or decoding of the received information is also performed in step 822. In step 824, the receiving device reads identification information included in the downloaded information that identifies the information as website content, and accordingly triggers hardware and or software resources to interpret, compile and reconstruct offline version 520. In steps 826-830, the user then has the choice of viewing offline version 520 immediately, or waiting until a more convenient time. Offline version 520 may be retained until the user is ready to view the website.

When the user is ready to view offline version 520, a determination must first be made in step 832 as to whether a template is required to view the data (as in the case of periodically updated information). In steps 832-838, the requirement and presence of a current template is determined, and options are given to the user if the template is not available. These options may include downloading a current template from the Internet, or alternatively, displaying the data without the use of a template. Context control is implemented in step 840, wherein device and environmental variables are read by the context control and, in view information in the downloaded content, changes may be made to the appearance or behavior of offline version 520.

The user views the offline version of the full-scale Internet website in step 842. If the user is no longer interested in offline version 520, the information may be manually or automatically deleted (step 844). Alternatively, in step 846 user 110 may navigate in offline version 520 similarly to the full-scale Internet website. Links and or data entry objects may be available for interaction with user 110. These links may be to other offline pages included within offline version 520, or to information available for download from an Internet connection. A determination is made in step 848 as to whether an object is local (i.e., already contained in the offline version) or only available via the Internet. If the object is local, the selected content may be displayed for user 110 in step 852. Alternatively, in step 850 an option is given to user 110 to obtain this information from the Internet. For devices that are not actively connected, a prompt may be shown inquiring as to whether the device should now connect to the Internet to get (or deliver, in the case of a text entry object) the desired information. For always connected devices, a check prompt may be shown to inform user 110 that the transaction may only be completed over the Internet. The prompt may then allow user 110 to proceed or cancel out of the operation.

The present invention is an improvement over the prior art because it provides desired information to a user of a device in the form of an offline version of a full-scale Internet website without requiring a live connection to the Internet. The user may immediately download relevant information via short-range wireless communication, which the receiving device uses to automatically identify and construct an offline version of an Internet website. This offline version delivers important information that both informs the user and captivates the user's attention, as well as helping to preserve the interest of the user until they are able to obtain, or deliver, additional information via a live Internet connection.

Accordingly, it will be apparent to persons skilled in the relevant art that various changes in forma and detail can be made therein without departing from the spirit and scope of the invention. The breadth and scope of the present invention should not be limited by any of the above-described exemplary embodiments, but should be defined only in accordance with the following claims and their equivalents.

The invention claimed is:

1. A method, comprising:
scanning information into a device from at least one of a barcode or RFID tag isolated from the Internet;
identifying, in the device, that the scanned information includes at least information usable for compiling an offline website;
triggering, in response to the identification of the information usable for compiling an offline web site, a browser application that utilizes only the scanned information in compiling an offline website, wherein the compiling includes context control that creates at least one of a custom appearance and behavior for the offline website; and
displaying the offline website on the device, the website including visual elements arranged in a manner corresponding to an associated online website but that are configured for display on an offline device and links to further sources of information available when the device is actively connected to the Internet.

2. The method of claim 1, wherein the scanned information is at least one of encoded, encrypted and compressed.

3. The method of claim 1, wherein the context control creates a custom appearance and/or behavior in the offline website based on sensed conditions including at least one of device identification, user identification, service provider identification, current time, current date, current location, user interests and available software information.

4. The method of claim 1, wherein the device prompts a user to establish an online wireless Internet connection when an Internet link is selected in the offline website.

5. The method of claim 1, further comprising the browser application determining whether it is necessary to retrieve a display template in order to display the received information.

6. The method of claim 1, further comprising a data entry object in the offline website, wherein a message is automatically created upon entry of information into the data entry object.

7. The method of claim 6, wherein the message is at least one of an email, SMS and MMS message.

8. The method of claim 1, wherein the device automatically deletes the offline website information when there is no user interest in the offline website.

9. A device, comprising:
a scanner for scanning information into a device from at least one of a barcode or RFID tag isolated from the Internet;
a controller for identifying that the scanned information includes at least information usable for compiling an offline website and for triggering, in response to the identification of the information usable for compiling an offline website, a browser application that utilizes only the scanned information in compiling an offline web site, wherein the compiling includes context control that creates at least one of a custom appearance or behavior for the offline website; and
a display for displaying the offline website, the website including visual elements arranged in a manner corresponding to an associated online website but that are configured for display on an offline device and links to further sources of information available when the device is actively connected to the Internet.

10. The device of claim 9, wherein the context control creates a custom appearance and/or behavior in the offline website based on sensed conditions including at least one of device identification, user identification, service provider identification, current time, current date, current location, user interests and available software information.

11. The device of claim 9, wherein a user is prompted to establish an online wireless Internet connection when an Internet link is selected in the offline website.

12. The device of claim 9, further comprising the browser application determining whether it is necessary to retrieve a display template in order to display the received information.

13. The device of claim 9, further comprising a data entry object in the offline website, wherein a message is automatically created upon entry of information into the object.

14. The device of claim 13, wherein the message is at least one of an email, SMS and MMS message.

15. The device of claim 9, wherein the offline website is automatically deleted when there is no user interest in the offline website.

16. A computer program product comprising computer executable program code recorded on a non-transitory computer readable storage medium, the computer executable program code comprising:
   code for scanning information into a device from at least one of a barcode or RFID tag isolated from the Internet;
   code for identifying, in the device, that the scanned information includes at least information usable for compiling an offline website;
   code for triggering, in response to the identification of the information usable for compiling an offline web site, a browser application that utilizes only the scanned information in compiling an offline website, wherein the compiling includes context control that creates at least one of a custom appearance or behavior for the offline website; and
   code for displaying the offline website on the device, the website including visual elements arranged in a manner corresponding to an associated online website but that are configured for display on an offline device and links to further sources of information available when the device is actively connected to the Internet.

17. The computer program product of claim 16, wherein the scanned information is at least one of encoded, encrypted and compressed.

18. The computer program product of claim 16, wherein the context control creates a custom appearance and/or behavior in the offline website based on sensed conditions including at least one of device identification, user identification, service provider identification, current time, current date, current location, user interests and available software information.

19. The computer program product of claim 16, wherein the device prompts a user to establish an online wireless Internet connection when an Internet link is selected in the offline website.

20. The computer program product of claim 16, further comprising the browser application determining whether it is necessary to retrieve a display template in order to display the received information.

21. The computer program product of claim 16, further comprising a data entry object in the offline website, wherein a message is automatically created upon entry of information into the object.

22. The computer program product of claim 21, wherein the message is at least one of an email, SMS and MMS message.

23. The computer program product of claim 16, wherein the device automatically deletes the offline website information when there is no user interest in the offline website.

24. A system, comprising:
   a source isolated from the Internet; and
   a device;
   the source storing an offline version of a full-scale Internet website in at least one of a barcode or RFID tag;
   the device scanning the at least one of a barcode or RFID tag from the source into the device and identifying, in the device, that the scanned information includes at least information usable for compiling an offline website;
   the device further triggering, in response to the identification of the information usable for compiling an offline website, a browser application that utilizes only the scanned information in compiling an offline website, wherein the compiling includes context control that creates at least one of a custom appearance or behavior for the offline website and displaying the offline website on the device, the website including visual elements arranged in a manner corresponding to an associated online website but that are configured for display on an offline device and links to further sources of information available when the device is actively connected to the Internet.

25. A device, comprising:
   at least one processor; and
   at least one memory including executable instructions, the at least one memory and the executable instructions being configured to, in cooperation with the at least one processor, cause the device to perform at least the following:
      scan information into a device from at least one of a barcode or RFID tag isolated from the Internet;
      identify that the scanned information includes at least information usable for compiling an offline website;
      trigger, in response to the identification of the information usable for compiling an offline web site, a browser application that utilizes only the scanned information in compiling an offline website, wherein the compiling includes context control that creates at least one of a custom appearance or behavior for the offline website; and
      display the offline website, the website including visual elements arranged in a manner corresponding to an associated online website but that are configured for display on an offline device and links to further sources of information available when the device is actively connected to the Internet.

26. The device of claim 25, wherein the short-range wireless communication includes scanning a passive device capable of communicating information.

27. The device of claim 25, wherein a user is prompted to establish an online wireless Internet connection when an Internet link is selected in the offline website.

28. The device of claim 25, further comprising the browser application determining whether it is necessary to retrieve a display template in order to display the received information.

* * * * *